May 1, 1934.     P. P. PATRICOSKI     1,957,352
FISHHOOK HOLDER
Filed Aug. 18, 1933     2 Sheets-Sheet 1
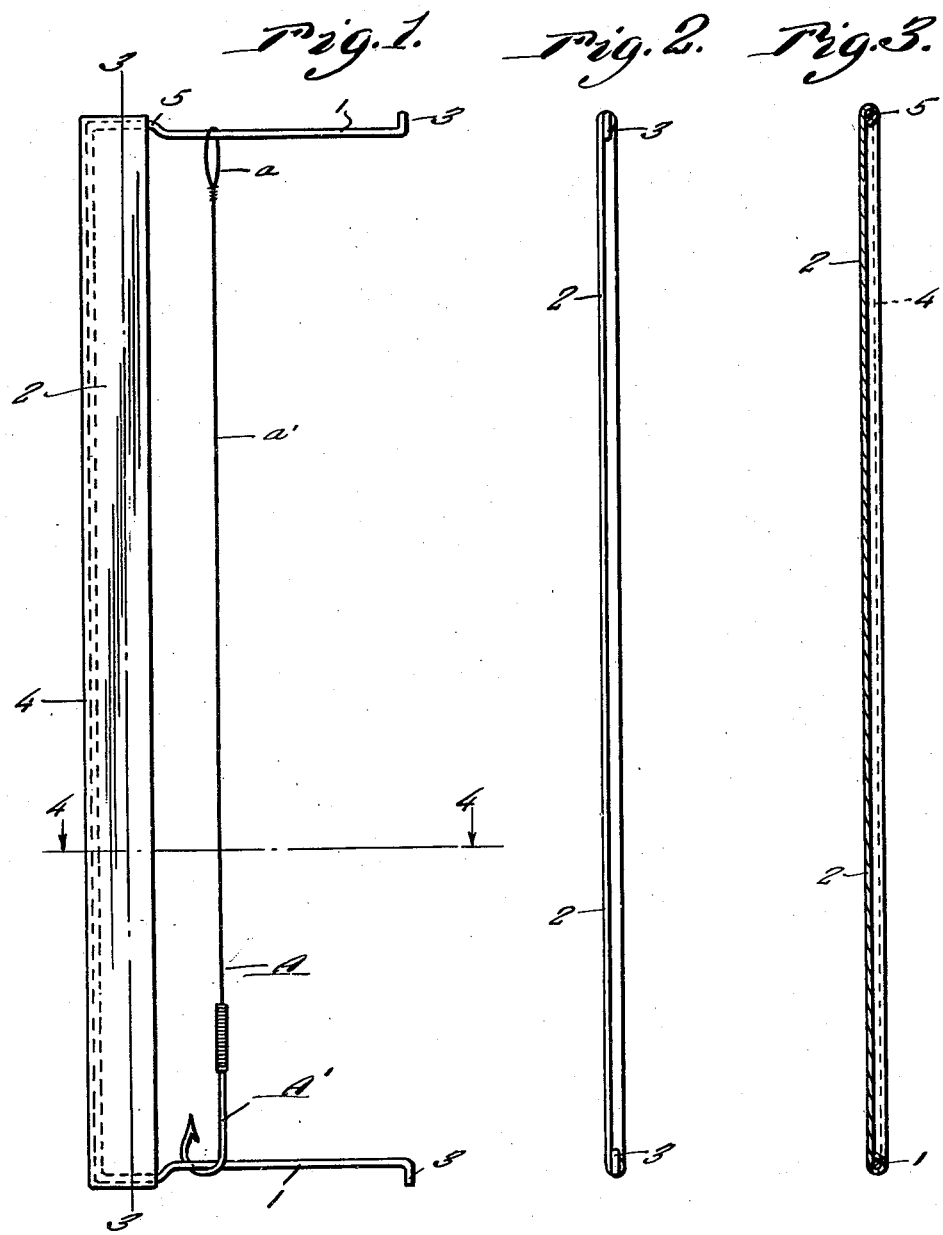
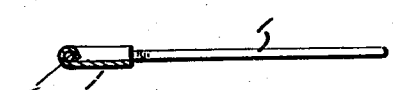
Inventor
P. P. Patricoski
By Clarence A. O'Brien
Attorney May 1, 1934.　　P. P. PATRICOSKI　　1,957,352
FISHHOOK HOLDER
Filed Aug. 18, 1933　　2 Sheets-Sheet 2
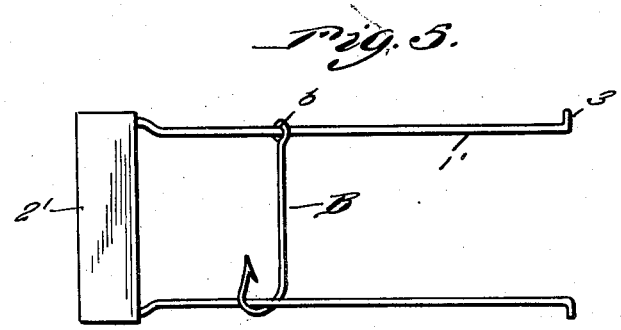
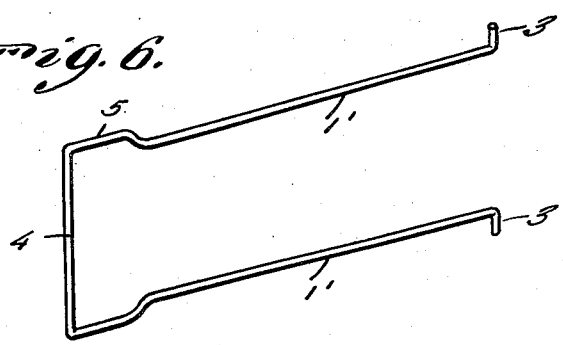
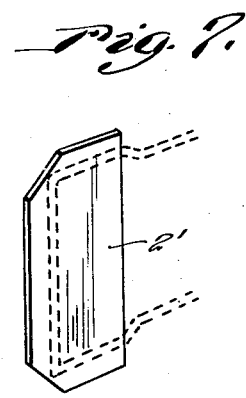
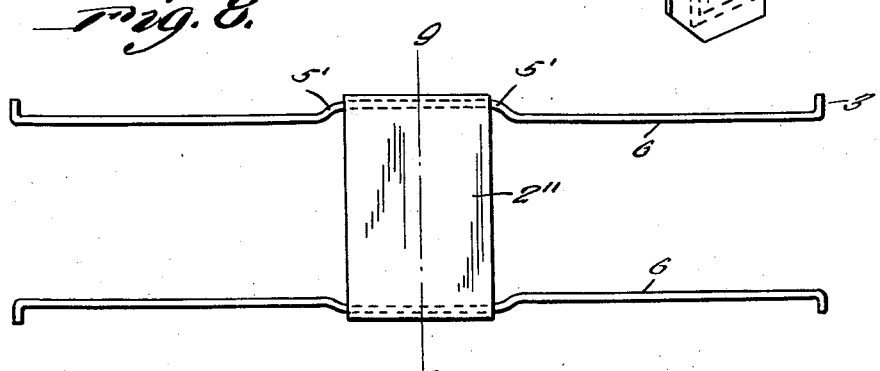
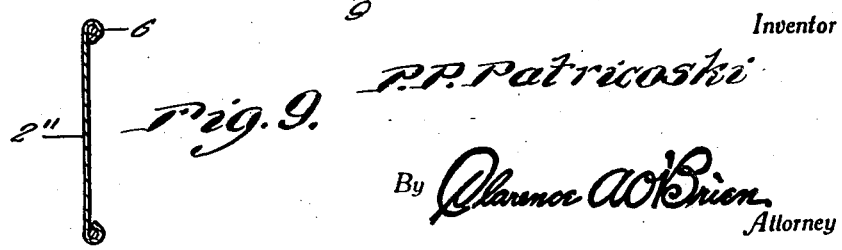
Inventor
P. P. Patricoski
By Clarence A. O'Brien
Attorney Patented May 1, 1934

1,957,352

UNITED STATES PATENT OFFICE 1,957,352

FISHHOOK HOLDER

Peter P. Patricoski, Mount Carmel, Pa.

Application August 18, 1933, Serial No. 685,766

4 Claims. (Cl. 43—32)

This invention relates to a holder for fish hooks, the general object of the invention being to provide a pair of spring arms, one for receiving the eye of a hook or the gut loop of a snelled hook and the other to receive a part of the hook, whereby the hook will be firmly held on the device and can be readily removed therefrom.

Another object of the invention is to provide a plate-like member on the device, which not only acts as a handle, but also acts as a pattern plate for receiving data to denote the size and pattern of the fish hooks carried by the device.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a view of the device made to hold snelled hooks.

Figure 2 is an edge view of Figure 1.

Figure 3 is a section on line 3—3 of Figure 1.

Figure 4 is a section on line 4—4 of Figure 1.

Figure 5 is a view of the device shaped to receive ringed hooks.

Figure 6 is a view of the wire part of the device.

Figure 7 is a view of the plate forming member, this view also showing how the plate forming member is adapted to be bent around the bight of the wire member.

Figure 8 is a view showing the device made of double form.

Figure 9 is a section on line 9—9 of Figure 8.

As shown in these drawings, the device is composed of the arms 1 formed of spring wire and the plate-like member 2, the arms 1 extending at right angles from the plate-like member 2 and the free end of each arm is bent outwardly at right angles, as shown at 3. In that form of the invention shown in Figures 1, 2, 3 and 4, the device is of considerable length so as to support snelled hooks, as shown at A, with the loops $a$ of the gut $a'$ passed over one of the arms and the hook A' placed over the other arm.

That form of the invention shown in Figures 5, 6 and 7 is made considerably shorter than the first form so that the ring or eye $b$ of the hook B can be placed on the limb 1' and the hook part engages the other limb. In both forms of the invention, the plate member 2 has its edges bent over the bight 4 of the wire member, which is of substantially U-shape and parts of the limbs of the wire member, these parts being offset outwardly, as shown at 5. Thus it will be seen that the hooks are held on the arms or limbs of the wire member by the outturned parts 3 of the parts 1'. Figure 7 shows the plate-like member 2' with its outer corners cut off so that the end and the outer edge of the plate-like member can be folded about the bight parts and parts 5 of the wire member.

Figures 8 and 9 show a double device in which the two pairs of arms are formed of the wires 6 which have their central portions offset outwardly to provide the parts 5' and the plate-like member 2'' has its ends bent over these portions so as to hold the wires spaced apart, as shown.

As before stated, the plate-like member not only acts as a handle for facilitating handling of the device, but data can be placed thereon to denote the sizes and patterns of the fish hooks carried by the devices. The hooks are placed on the limbs or arms by first slightly pressing the arms toward each other, which will allow a hook to be put on or taken off the device.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. A fish hook holder comprising a pair of spaced resilient arms, each having one end free for enabling the hook portion of a fish hook to be placed on one arm and the eye portion on the other arm and each arm having an outwardly bent part at its free end and a plate-like member connected to the other ends of said arms.

2. A fish hook holder comprising a pair of resilient arms, a plate-like member connecting the arms together, at one end thereof, the other ends of the arms being bent outwardly and said arms having outwardly offset portions adjacent the point where they engage the plate-like member, one arm receiving a portion of the hook of the fish hook and the other arm the eye portion thereof, the outwardly bent portions and the offset portions forming shoulders for limiting sliding movement of the hook on the arms.

3. A fish hook holder comprising a substantially U-shaped member formed of spring wire and having outwardly bent portions at its free ends, and the limbs adjacent the bight offset outwardly, and a plate having its edges bent around the bight and said offset portions, said outwardly bent portions and the offset portions forming shoulders for limiting sliding movement of the hooks on said limbs.

4. A fish hook holder comprising a pair of spring wires having their ends bent outwardly and their central portions offset outwardly, and a plate having its ends bent around said offset portions and spacing the members apart, said bent ends and the offset portions forming shoulders for limiting sliding movement of fish hooks placed on said wires.

PETER P. PATRICOSKI.